United States Patent
Hayakawa et al.

(10) Patent No.: US 9,361,124 B2
(45) Date of Patent: Jun. 7, 2016

(54) COMPUTER SYSTEM AND STARTUP METHOD

(71) Applicant: Hitachi, Ltd., Tokyo (JP)

(72) Inventors: Norimitsu Hayakawa, Tokyo (JP); Keisuke Yoshida, Yokohama (JP); Takashi Shimojo, Yokohama (JP); Masatoshi Konagaya, Yokohama (JP); Yoshihito Nakagawa, Tokyo (JP); Toshiomi Moriki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 190 days.

(21) Appl. No.: 14/260,919

(22) Filed: Apr. 24, 2014

(65) Prior Publication Data

US 2014/0372742 A1 Dec. 18, 2014

(30) Foreign Application Priority Data

Jun. 13, 2013 (JP) .................... 2013-124391

(51) Int. Cl.
*G06F 9/44* (2006.01)
*G06F 9/45* (2006.01)
*G06F 9/455* (2006.01)

(52) U.S. Cl.
CPC .............. *G06F 9/441* (2013.01); *G06F 9/4406* (2013.01); *G06F 9/45533* (2013.01)

(58) Field of Classification Search
CPC .... G06F 9/441; G06F 9/4406; G06F 9/45533
See application file for complete search history.

(56) References Cited

U.S. PATENT DOCUMENTS

| 6,711,605 | B2 * | 3/2004 | Sekiguchi | G06F 9/4843 713/1 |
| 6,996,828 | B1 | 2/2006 | Kimura et al. | |
| 7,409,536 | B2 * | 8/2008 | Guo | G06F 9/4843 713/1 |
| 7,689,820 | B2 * | 3/2010 | Pierce | G06F 9/4405 712/203 |
| 8,180,993 | B2 * | 5/2012 | Hama | G06F 9/4405 711/170 |
| 8,484,452 | B2 | 7/2013 | Motohama et al. | |
| 2007/0055857 | A1 * | 3/2007 | Wang | G06F 9/4406 713/2 |

FOREIGN PATENT DOCUMENTS

| JP | 11-149385 | 6/1999 |
| WO | WO 2009/113394 A1 | 9/2009 |

* cited by examiner

*Primary Examiner* — Stefan Stoynov
(74) *Attorney, Agent, or Firm* — Foley & Lardner LLP

(57) ABSTRACT

A computer system comprising a plurality of computers on which a plurality of operating systems run, wherein a memory stores a first hardware control unit, wherein a storage device stores a first OS image, a second OS image, a second hardware control unit for executing start processing of the second OS, and an address rewrite unit, wherein the second hardware control unit includes a start unit for starting the second hardware control unit, wherein the address rewrite unit which is started by the first OS is configured to: obtain an address of a storage area, in which address data to be rewritten is stored, as a target address, rewrite the address data stored in the storage area corresponding to the obtained target address and start the start unit, wherein the start unit is configured to start the second hardware control unit by using the rewritten address data.

8 Claims, 10 Drawing Sheets

RESOURCE RANGE DEFINITION INFORMATION

260

PROCESSOR

261

| PROCESSOR NUMBER | ATTRIBUTE |
| --- | --- |
| 1 | FIRST DIVIDED PROCESSOR |
| 2 | SECOND DIVIDED PROCESSOR |
| 3 | FIRST DIVIDED PROCESSOR |
| ⋮ | ⋮ |
| 2n-1 | FIRST DIVIDED PROCESSOR |
| 2n | SECOND DIVIDED PROCESSOR |

MEMORY

262

| RANGE START POINT | RANGE END POINT | ATTRIBUTE |
| --- | --- | --- |
| PHYSICAL ADDRESS 1 | PHYSICAL ADDRESS 2 | FIRST DIVIDED MEMORY |
| PHYSICAL ADDRESS 2 | PHYSICAL ADDRESS 3 | SHARED |
| PHYSICAL ADDRESS 3 | PHYSICAL ADDRESS 4 | SECOND DIVIDED MEMORY |

I/O DEVICE

263

| I/O DEVICE NUMBER | ATTRIBUTE |
| --- | --- |
| 1 | FIRST DIVIDED I/O DEVICE |
| 2 | SECOND DIVIDED I/O DEVICE |
| 3 | FIRST DIVIDED I/O DEVICE |
| ⋮ | ⋮ |
| 2n-1 | FIRST DIVIDED I/O DEVICE |
| 2n | SECOND DIVIDED I/O DEVICE |

*Fig. 5*

COMPUTER SYSTEM AND STARTUP METHOD

CLAIM OF PRIORITY

The present application claims priority from Japanese patent application JP 2013-124391 filed on Jun. 13, 2013, the content of which is hereby incorporated by reference into this application.

BACKGROUND OF THE INVENTION

The present invention relates to a computer system in which a plurality of OSes run on one computer, and a startup method of the computer.

In recent years, attention has been given to the technique of starting two or more OSes (operating systems) on one physical computer, in order to make efficient use of hardware resources on the physical computer. Refer to, for example, Japanese Patent Application Laid-open No. Hei 11-149385 and WO 2009/113394.

Japanese Patent Application Laid-open No. Hei 11-149385 discloses a "multi-operating system computer that alternately operates, as an operating OS, a first OS (operating system) for executing a plurality of tasks, to which priorities are assigned, in order of the priorities, and a second OS being different from the first OS, and that is included with an OS switch unit for switching the operating OS from the first OS to the second OS when the first OS is being operated as the operating OS and when a predetermined task, to which a predetermined priority is assigned, among the plurality of tasks, is executed as a switching trigger task for identifying a switching trigger of the operating OS".

WO 2009/113394 discloses that "A multi-OS boot device which boots the at least two operating systems (operating system, hereinafter referred to as OS) of a first OS and a second OS; comprising (1) a primary storage unit having a memory area with respect to which a memory space is defined; (2) a secondary storage unit for storing a second boot loader and the second OS; (3) an OS execution unit for causing a first boot loader to perform loading the second boot loader and the second OS from the secondary storage unit into the memory area of the primary storage unit, which is defined as a first memory space managed by the first OS with respect to the primary storage device by a first context, wherein the loading is performed by running the first boot loader, which is to run under the first OS that operates in the first context being a context indicating control information for a CPU (Central Processing Unit) and being a context for the first OS, under the first OS operating in the first context; and (4) a loader execution unit for causing the second boot loader to generate a context for the second boot loader, which defines a third memory space with respect to the primary storage unit, wherein the third memory space includes a memory area defined as a second memory space managed by the second OS and a memory area where the second boot loader and the second OS have been loaded, and to perform switching from the first context to the context generated for the second boot loader, by executing the second boot loader, which has been loaded into the memory area defined as the first memory space, under the first OS operating in the first context, for causing the second boot loader to load the second OS, which has been loaded into the memory area of the primary storage unit by the first boot loader, into the memory area of the primary storage unit defined as the second memory space included in the third memory space, and to generate a context for the second OS, by executing the second boot loader in the context for the second boot loader, and for causing the second boot loader to perform switching from the context for the second loader to the context generated for the second OS, and to boot the second OS in the context for the second OS.

SUMMARY OF THE INVENTION

Japanese Patent Application Laid-open No. Hei 11-149385 and WO 2009/113394 are characterized in that a device driver of an OS1 reads out a boot loader and an image file of an OS2 from an external storage device, and writes these in a memory area for the OS2, so as to start the OS2.

However, access by the OS1 to a storage area in which the boot loader and the image file of the OS2 are stored may be prohibited for security reasons. Further, in a case where an image file of the OS1 and the image file of the OS2 are stored in different external storage devices, the OS1 may not be able to use a device driver of the external storage device, in which the image file of the OS2 is stored, because of an old kernel of the OS1 and other reasons. As described above, there may be the cases where the OS2 cannot be started due to the limitations on the security and the hardware configuration.

It is an object of the present invention to provide a system for starting the OS2 according to a procedure similar to normal start processing, without direct involvement of the OS1, and a startup method thereof.

The present invention can be appreciated by the description which follows in conjunction with the following figures, wherein: a computer system comprising a plurality of computers on which a plurality of operating systems run. Each of the plurality of computers includes a processor, a first memory coupled to the processor, a second memory coupled to the processor, an I/O device coupled to the processor, and a storage device coupled to the processor. The plurality of operating system include a first operating system and a second operating system. The second memory stores a first hardware control unit for controlling hardware included in the computer and executing start processing of the first operating system, in a case where the first operating system is started. The storage device stores a first operating system image as an execution image of the first operating system, a first operating system boot loader for starting the first operating system, a second operating system image as an execution image of the second operating system, a second operating system boot loader for starting the second operating system, a second hardware control unit for controlling the hardware included in the computer and executing start processing of the second operating system, in a case where the second operating system is started, and an address rewrite unit for rewriting address data which is an absolute address of a storage area in the first memory, the storage area stores information to be referred to by the second hardware control unit. The second hardware control unit includes a start unit for starting the second hardware control unit. The processor is configured to write in the first memory the first hardware control unit stored in the second memory, and execute the first hardware control unit, in a case of being powered on. The first hardware control unit is configured to: read the second hardware control unit and the address rewrite unit from the storage device to write in a predetermined storage area of the first memory; obtain a head address of a storage area in which the start unit included in the second hardware control unit is stored, and write the head address in the first memory as base address data; read the first operating system boot loader from the storage device to write in the first memory; and start the first operating system boot loader written in the first memory. The first operating system boot loader is configured to: read the first operating system image from the storage device to write in the first memory; and start the first operating system by executing the first operating system image written in the first memory. The first operating system is configured to start the address rewrite unit. The address rewrite unit is configured to: obtain the base address data written in the first memory, obtain an address of a storage area, in which address data to be rewritten is stored, as a target address, rewrite the address data stored in the storage area corresponding to the obtained target address, based on the obtained base address data, and start the start unit. The start unit is configured to start the second hardware control unit by using the rewritten address data. The second hardware control unit is configured to: read the second operating system boot loader from the storage device to write in the first memory; and start the second operating system boot loader written in the first memory. The second operating system boot loader is configured to: read the second operating system image from the storage device to write in the first memory; and start the second operating system by executing the second operating system image written in the first memory.

According to the present invention, the second OS can be started without the direct involvement of the first OS. Further, as the address data is rewritten by the address rewrite unit, normal operation is made possible no matter which storage area the second hardware control unit is written in.

The problems, structures and effects other than those described above are made clear by the following explanation of the embodiment.

BRIEF DESCRIPTION OF THE DRAWINGS

The present invention can be appreciated by the description which follows in conjunction with the following figures, wherein:

FIG. 5 is an explanatory view illustrating an example of resource range definition information according to the first embodiment of the present invention.

DETAILED DESCRIPTION OF THE PREFERRED EMBODIMENTS

Hereinafter, an embodiment will be explained with reference to the drawings.

First Embodiment

Figure 1:
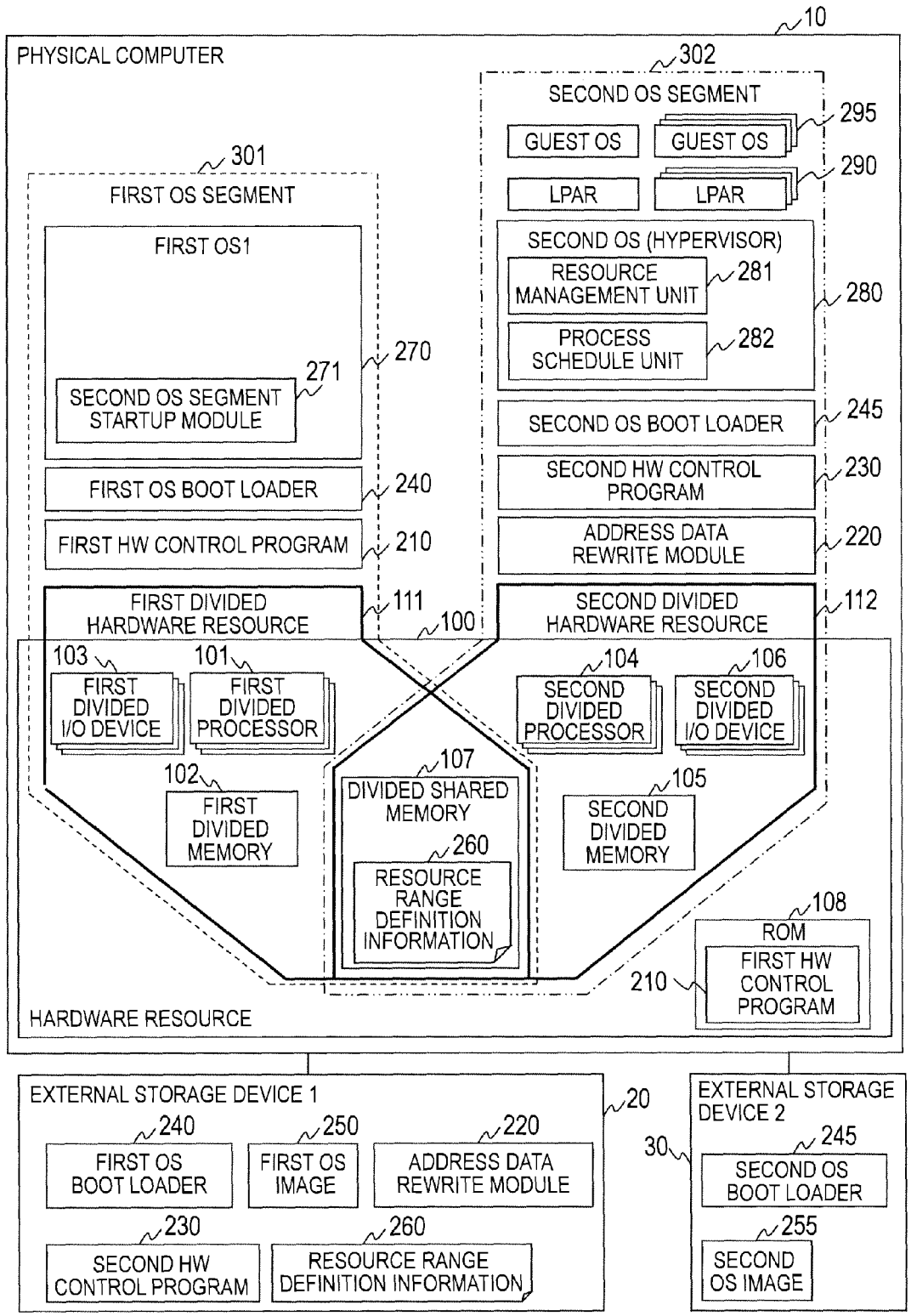
FIG. 1 is an explanatory view illustrating an example of the structure of a computer system according to a first embodiment of the present invention.

FIG. 1 is an explanatory view illustrating an example of the structure of a computer system according to a first embodiment of the present invention.

The computer system according to this embodiment is formed by a physical computer 10, a first external storage device 20, and a second external storage device 30. The physical computer 10 is coupled to the first external storage device 20 and the second external storage device 30 directly or via a network. A WAN, a LAN, or the like is conceivable as the network. Incidentally, the physical computer 10 may include a storage device in its inside.

The physical computer 10 is the computer on which an OS, executing predetermined processing, runs. According to this embodiment, it should be noted that two OSes, that is, a first OS 270 and a second OS 280, are assumed to run. Incidentally, the first OS 270 and the second OS 280 may employ either a general OS or a hypervisor which provides a virtualization function. In the following explanation, it is assumed that the first OS 270 is the general OS, and the second OS 280 is the hypervisor.

Further, according to this embodiment, the first OS 270 and the second OS 280 are assumed to run in parallel. Specifically, such a starting method is employed that the second OS 280 is started after the first OS 270 is started. Furthermore, the second OS 280 is started according to a general starting procedure.

As an OS image of the second OS 280 is not dealt with by the first OS 270, security problems can be solved. In addition, the second OS 280 can be started independently of a device driver of the first OS 270.

The physical computer 10 includes a plurality of processors, a plurality of memories, a plurality of I/O devices, and a ROM 108, as hardware resources 100.

The processors execute programs stored in the memories. It is possible to implement functions, as OS and like, by the processors executing the programs. Hereinafter, the explanation of the processing made by taking the program as a subject means that this program is executed by the processor.

The memories store the programs that are executed by the processors and information that is necessary for executing these programs. Further, the memories include work areas of the respective programs.

The I/O devices are the devices coupled to the external devices, and used for inputting information from the outside, and outputting information to the outside. For example, the I/O devices may include a network interface, a disk interface, and the like.

The ROM 108 is the storage medium that is used especially for storing a first HW (hardware) control program 210 used, in a case of starting the OS. The first HW control program 210 may be stored in the first external storage device 20 or the like. Incidentally, the first HW control program 210 may be a BIOS (Basic Input/Output System).

The first HW control program 210 controls the hardware resources 100 of the physical computer 10, reads the programs, such as an OS boot loader and the OS image, necessary to start the OS, from the external storage device, and writes the read programs in the memory, in a case of executing start processing of the OS.

The first external storage device 20 and the second external storage device 30 are the devices for storing the programs and the information that are required for the physical computer 10 to start the OS.

The first external storage device 20 and the second external storage device 30 can be, for example, a storage medium such as an HDD (Hard Disk Drive) or an SSD (Solid State Drive). Further, the first external storage device 20 and the second external storage device 30 may be a storage system which includes a controller and a plurality of storage media.

The physical computer 10 reads the programs and the information from the first external storage device 20 and the second external storage device 30, and starts the plurality of OSes. Here, the programs and the information that are stored in the first external storage device 20 and the second external storage device 30 will be explained.

The first external storage device 20 stores a first OS boot loader 240, a first OS image 250, an address data rewrite module 220, and a second HW control program 230 as the programs, and stores resource range definition information 260 as the information.

The first OS image 250 is the OS image of the first OS 270.

The first OS boot loader 240 starts the first OS 270 by using the first OS image 250. According to this embodiment, the first OS boot loader 240 reads the first OS image 250 from the first external storage device 20, writes the first OS image 250 in a first divided memory 102, and starts the first OS 270.

The second HW control program 230 controls the hardware resources 100 of the physical computer 10, reads the programs, such as the OS boot loader and the OS image, necessary to start the OS from the external storage device, and writes the read programs in the memory, in a case of executing the start processing of the OS.

The address data rewrite module 220 rewrites address data in a case of starting the second HW control program 230, and thereafter, the second HW control program 230 is started. Here, the address data is a head address (pointer) of a storage area stored a function or the like that is referred to, in a case of starting the second HW control program 230.

The resource range definition information 260 stores information on allocation of the hardware resources 100. Incidentally, the details of the resource range definition information 260 will be described later with reference to FIG. 5.

The second external storage device 30 stores a second OS boot loader 245 and a second OS image 255 as the programs.

The second OS image 255 is the OS image of the second OS 280.

The second OS boot loader 245 starts the second OS 280 by using the second OS image 255. According to this embodiment, the second OS boot loader 245 reads the second OS image 255 from the second external storage device 30, writes the second OS image 255 in a second divided memory 105, and starts the second OS 280.

Incidentally, the second OS boot loader 245 and the second OS image 255 may be stored in the first external storage device 20.

The hardware resources 100 are allocated based on the resource range definition information 260. According to this embodiment, the hardware resources 100 are divided into the hardware resource that is exclusively used by each of the programs such as the OS, and the hardware resource that is shared and used by the respective programs.

Here, the exclusively-used hardware resource means the hardware resource that is exclusively used by the program to which this hardware resource is allocated and that cannot be used by other programs.

In the following explanation, the hardware resources 100 that are divided based on the resource range definition information 260 are referred to as divided hardware resources 100. According to this embodiment, the divided hardware resources 100 include divided processors, divided memories, a divided shared memory, and divided I/O devices.

Further, in the following explanation, the divided hardware resources and the programs that run on the divided hardware resources are collectively referred to as an OS segment. According to this embodiment, it is assumed that one OS runs on one OS segment.

According to this embodiment, there are two OS segments on the physical computer 10, that is, a first OS segment 301 and a second OS segment 302.

First divided hardware resources 111 are allocated to the first OS segment 301. The first divided hardware resources 111 include first divided processors 101, the first divided memory 102, first divided I/O devices 103, and a divided shared memory 107. Further, the first HW control program 210, the first OS boot loader 240, and the first OS 270 run on the first divided hardware resources 111.

Second divided hardware resources 112 are allocated to the second OS segment 302. The second divided hardware resources 112 include second divided processors 104, the second divided memory 105, second divided I/O devices 106, and the divided shared memory 107. Further, the address data rewrite module 220, the second HW control program 230, the second OS boot loader 245, and the second OS 280 run.

As described above, each of the programs included in each OS segment uses only the divided hardware resource that is allocated to this OS segment, and does not use the divided hardware resource that is allocated to another OS segment.

However, as will be described later, the first divided processor 101 that executes a second OS segment startup module 271 issues a start instruction to the second divided processor 104 to start the second divided processor 104, in a case of starting the second OS 280. It should be noted that this processing is permitted, only in a case where the second OS segment 302 is started for the first time. Further, this processing is for simply starting the divided processor, which does not mean that the first OS segment 301 uses the divided processor exclusively. Therefore, problems in security, an allocation policy of the hardware resources and the like are not caused.

Here, an explanation will be given to the programs that run on the OS segments. Incidentally, the explanation on the program identical to that of the first external storage device 20 will be omitted.

The first HW control program 210, the first OS boot loader 240, and the first OS 270 run on the first OS segment 301.

The first OS 270 is the OS that runs on the first divided hardware resource 111. The first OS 270 includes the second OS segment startup module 271.

The second OS segment startup module 271 issues the instruction to start the second OS. Specifically, the second OS segment startup module 271 instructs to start the second divided processor 104.

Incidentally, the first divided processor 101 that executes the second OS segment startup module 271 operates (starts) the second divided processor 104. However, this processing is permitted, only in a case where the second divided hardware resource 112 allocated to the second OS segment 302 is started for the first time, and therefore, the security problems are not caused.

The address data rewrite module 220, the second HW control program 230, the second OS boot loader 245, and the second OS 280 run on the second OS segment 302.

The second OS 280 according to this embodiment corresponds to the hypervisor. The hypervisor uses the second divided hardware resource 112 to generate a plurality of LPARs 290, and allows a plurality of guest OSes 295 to run on the generated LPARs 290. The hypervisor according to this embodiment has a resource management unit 281 and a process schedule unit 282.

The resource management unit 281 manages the second divided hardware resources 112 based on the resource range definition information 260. The process schedule unit 282 allows the guest OSes 295 to run on the LPARs 290 which are generated by using the second divided hardware resource 112.

Figure 2:
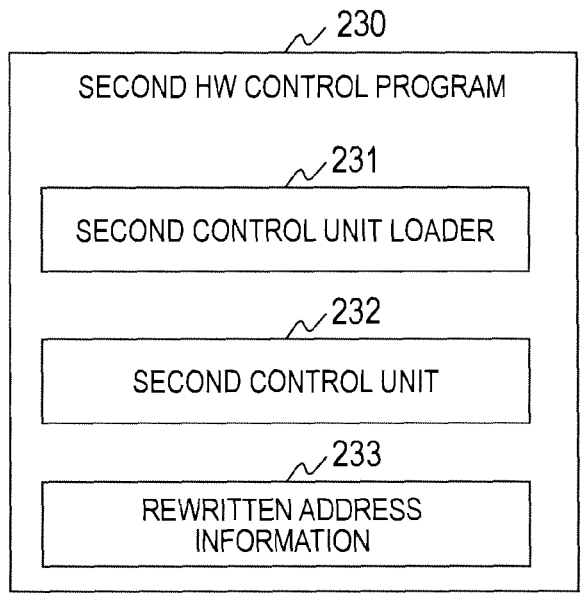
FIG. 2 is an explanatory view illustrating an example of the structure of a second HW control program according to the first embodiment of the present invention.

FIG. 2 is an explanatory view illustrating an example of the structure of the second HW control program 230 according to the first embodiment of the present invention.

The second HW control program 230 is the program executed in a case of executing the start processing of the second OS 280. The second HW control program 230 includes a second control unit loader 231, the second control unit 232, and rewritten address information 233.

The second control unit loader 231 starts the second control unit 232. Specifically, the second control unit loader 231 writes the second control unit 232 in free space in the second divided memory 105, and starts the second control unit 232.

According to this embodiment, information on the address data that is held by the second control unit loader 231 is converted by the address data rewrite module 220 that will be described later.

The second control unit 232, after being started by the second control unit loader 231, controls the second divided hardware resources 112. Further, the second control unit 232 reads the second OS boot loader 245 from the second external storage device 30, and writes the read second OS boot loader 245 in the second divided memory 105. Thereafter, the second control unit 232 starts the second OS boot loader 245 written in the second divided memory 105.

The rewritten address information 233 stores information on a storage area in which stores the address data to be rewritten. The details of the rewritten address information 233 will be described later with reference to FIG. 6.

General computers have the HW control program which controls the hardware resources of the computer. In a case of executing the start processing of the OS, the HW control program is written in the memory, prior to the OS image, and executed.

As illustrated in FIG. 2, the general HW control program includes a control unit loader. The control unit loader is the program that is executed initially, in a case of starting the computer. Therefore, the control unit loader is set to refer to the address data that is indicated by an absolute address so as to read a piece of the data such as a function.

In a case where the two different HW control programs are executed on one computer in order to start the two OSes independently, there is a possibility that the control unit loader does not operate normally due to an overlap of the address data. Further, similar problems are also caused, in a case where the HW control programs are written in the different storage areas each other.

Namely, in a case where the HW control program is written in the divided memory, the storage area in which the HW control program is stored is different from the normal storage area. Thus, the address of a reference destination that is indicated by the address data becomes the inappropriate address, which causes such a possibility that the control unit loader does not operate normally.

The present invention provides the function for operating the second control unit loader 231 normally, without depending on the storage area in which the second HW control program 230 is written.

Specifically, the address data rewrite module 220 rewrites the address data that is set for the second control unit loader 231 so that the address data corresponds to the storage area in which the second HW control program 230 is written. As the address of the reference destination is thus changed to the appropriate address, it is possible for the second control unit loader 231 to call a function and the like and execute the processing normally.

Incidentally, the second control unit 232 is written in the free space in the second divided memory 105 by the second control unit loader 231, and is started. Therefore, a problem is not caused that the second control unit 232 runs on the first divided memory 102, because the second control unit loader 231 runs normally.

Figure 3:
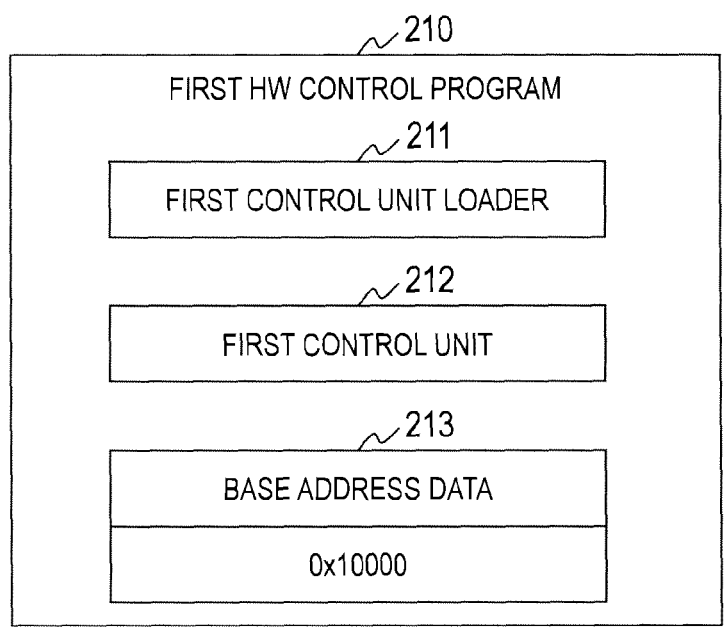
FIG. 3 is an explanatory view illustrating an example of the structure of a first HW control program according to the first embodiment of the present invention.

FIG. 3 is an explanatory view illustrating an example of the structure of the first HW control program 210 according to the first embodiment of the present invention.

The first HW control program 210 is the program executed in a case of executing the start processing of the first OS 270, in other words, in a case of starting the system. The first HW control program 210 includes a first control unit loader 211, the first control unit 212, and base address data 213.

The first control unit loader 211 starts the first control unit 212. Specifically, the first control unit loader 211 writes the first control unit 212 in free space in the first divided memory 102, and starts the first control unit 212.

The first control unit 212, after being started by the first control unit loader 211, controls the first divided hardware resources 111. The first control unit 212 according to this embodiment executes the following processing before starting the first OS 270.

The first control unit 212 reads the address data rewrite module 220 and the second HW control program 230 from the first external storage device 20, and writes the read address data rewrite module 220 and the read second HW control program 230 in the second divided memory 105.

The first control unit 212 obtains the head address of the storage area in which the second control unit loader 231 included in the HW control program 2 is stored, and holds the obtained address as the base address data 213. Further, the first control unit 212 writes the base address data 213 in a specific storage area in the second divided memory 105.

Incidentally, it is assumed that this specific storage area is defined in advance. Further, it is assumed that the address data rewrite module 220 is set in advance to refer to this specific storage area.

After the above-described processing is completed, the first control unit 212 reads the first OS boot loader 240 from the first external storage device 20, and writes the read first OS boot loader 240 in the first divided memory 102. Thereafter, the first control unit 212 starts the first OS boot loader 240 written in the first divided memory 102.

The base address data 213 is the head address of the storage area in which the second control unit loader 231 is stored.

Figure 4:
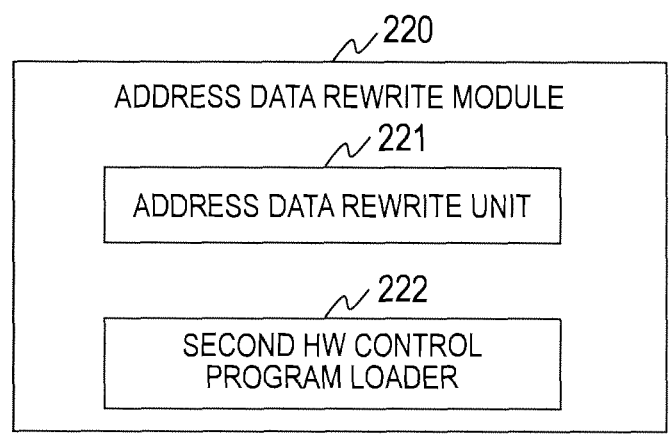
FIG. 4 is an explanatory view illustrating an example of the structure of an address data rewrite module according to the first embodiment of the present invention.

FIG. 4 is an explanatory view illustrating an example of the structure of the address data rewrite module 220 according to the first embodiment of the present invention.

The address data rewrite module 220 converts the address data held by the second control unit loader 231. Before the first OS 270 is started, the address data rewrite module 220 is read from the first external storage device 20 by the first HW control program 210 and written in the second divided memory 105. Further, the address data rewrite module 220 is started by the second OS segment startup module 271.

The address data rewrite module 220 includes an address data rewrite unit 221 and a second HW control program loader 222.

The address data rewrite unit 221 converts the address data in the second control unit loader 231. Specifically, the following processing is executed.

The address data rewrite unit 221 refers to a relocation section of the second HW control program 230 to obtain the address of the storage area in which the address data is stored.

The address data rewrite unit 221 adds the base address data 213 to the address data stored in the storage area that corresponds to the obtained address to rewrite this address data.

It should be noted that, in a case where the information on the address of the storage area, in which the address data is stored, is included in the second HW control program 230 in advance, the address data rewrite module 220 may obtain the address of the storage area included in this address data, by referring to the information included in the second HW control program 230.

After the address data of the second control unit loader 231 included in the second HW control program 230 is rewritten, the second HW control program loader 222 starts the second control unit loader 231.

As the rewritten address data is converted into the address data corresponding to the predetermined storage area of the second divided memory 105, it is possible for the second control unit loader 231 to refer to the function and the like properly based on the rewritten address data. Thus, the normal operation of the second control unit loader 231 is made possible.

FIG. 5 is an explanatory view illustrating an example of the resource range definition information 260 according to the first embodiment of the present invention.

The resource range definition information 260 stores information on the range (an allocation amount, an allocation number and the like) of the hardware resources 100 to be allocated as the divided hardware resources. According to this embodiment, the resource range definition information 260 includes processor definition information 261, memory definition information 262, and I/O device definition information 263.

The processor definition information 261 includes a processor number 2611 and an attribute 2612. The processor number 2611 is the identification number for uniquely identifying each of the processors of the physical computer 10. The attribute 2612 is the information about an allocation attribute of each of the processors.

In a case where the processor is shared and used by the respective OS segments, the information to the effect that the processor is shared and used is stored in the attribute 2612. For example, "shared" is stored in the attribute 2612.

Further, in a case where the processor is used exclusively by the OS segment, the information for identifying the OS segment is stored in the attribute 2612. In a case where the processor is allocated to the first OS segment 301, for example, the "first divided processor" is stored in the attribute 2612. Thus, the processor that is used exclusively by each of the OS segments can be defined.

In the example illustrated in FIG. 5, the processors having the odd-numbered identification numbers in the processor number 2611 are defined as the first divided processors 101 to be allocated to the first OS segment 301, and the processors having the even-numbered identification numbers in the processor number 2611 are defined as the second divided processors 104 to be allocated to the second OS segment 302.

The memory definition information 262 includes a range start point 2621, a range end point 2622 and an attribute 2623.

The range start point 2621 and the range end point 2622 are the addresses of start points and end points of storage areas that are allocated as the divided memories. The attribute 2623 is the information on an allocation attribute of each of the storage areas. Incidentally, the head address of the storage area and the length of the storage area may be used as the information for identifying the storage area, instead of the range start point 2621 and the range end point 2622.

In a case where the storage area is shared and used by the respective OS segments, that is, in a case where it is the divided shared memory, "shared" is stored in the attribute 2623.

In a case where the storage area is used exclusively by the OS segment, the information for identifying the OS segment is stored in the attribute 2623. In a case where the storage area is allocated to the first OS segment 301, for example, the "first divided memory" is stored in the attribute 2623. Thus, the storage area, that is, the divided memory that is used exclusively by each of the OS segments can be defined.

In the example illustrated in FIG. 5, the storage area in the range from a physical address 1 to a physical address 2 is defined as the first divided memory 102 that is allocated to the first OS segment 301, and the storage area in the range from a physical address 3 to a physical address 4 is defined as the second divided memory 105 that is allocated to the second OS segment 302. Further, the storage area in the range from the physical address 2 to the physical address 3 is defined as the divided shared memory 107 that is allocated to the first OS segment 301 and the second OS segment 302.

The I/O device definition information 263 includes an I/O device number 2631 and an attribute 2632. The I/O device number 2631 is the identification number for uniquely identifying each I/O of the physical computer 10. The attribute 2632 is the information about an allocation attribute of each of the I/O devices.

In a case where the I/O device is shared and used by the respective OS segments, the information to the effect that the I/O device is shared and used is stored in the attribute 2632. For example, "shared" is stored in the attribute 2632.

In a case where the I/O device is used exclusively by the OS segment, the information for identifying the OS segment is stored in the attribute 2632. In a case where the I/O device is allocated to the first OS segment 301, for example, the "first divided I/O device" is stored in the attribute 2632. Thus, the I/O device that is used exclusively by each of the OS segments can be defined.

In the example illustrated in FIG. 5, the I/O devices having the odd-numbered identification numbers in the I/O device number 2631 are defined as the first divided I/O devices 103 to be allocated to the first OS segment 301, and the I/O devices having the even-numbered identification numbers in the I/O device number 2631 are defined as the second divided I/O devices 106 to be allocated to the second OS segment 302.

Figure 6:
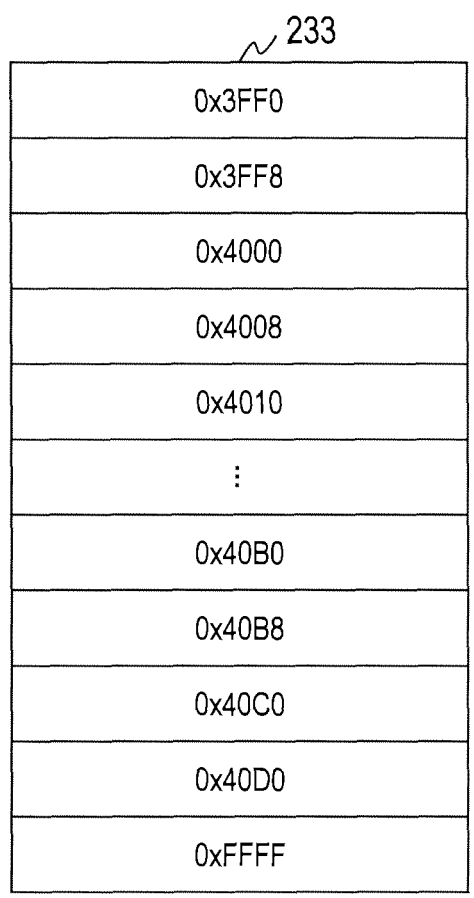
FIG. 6 is an explanatory view illustrating an example of rewritten address information according to the first embodiment of the present invention.
Figure 7A:
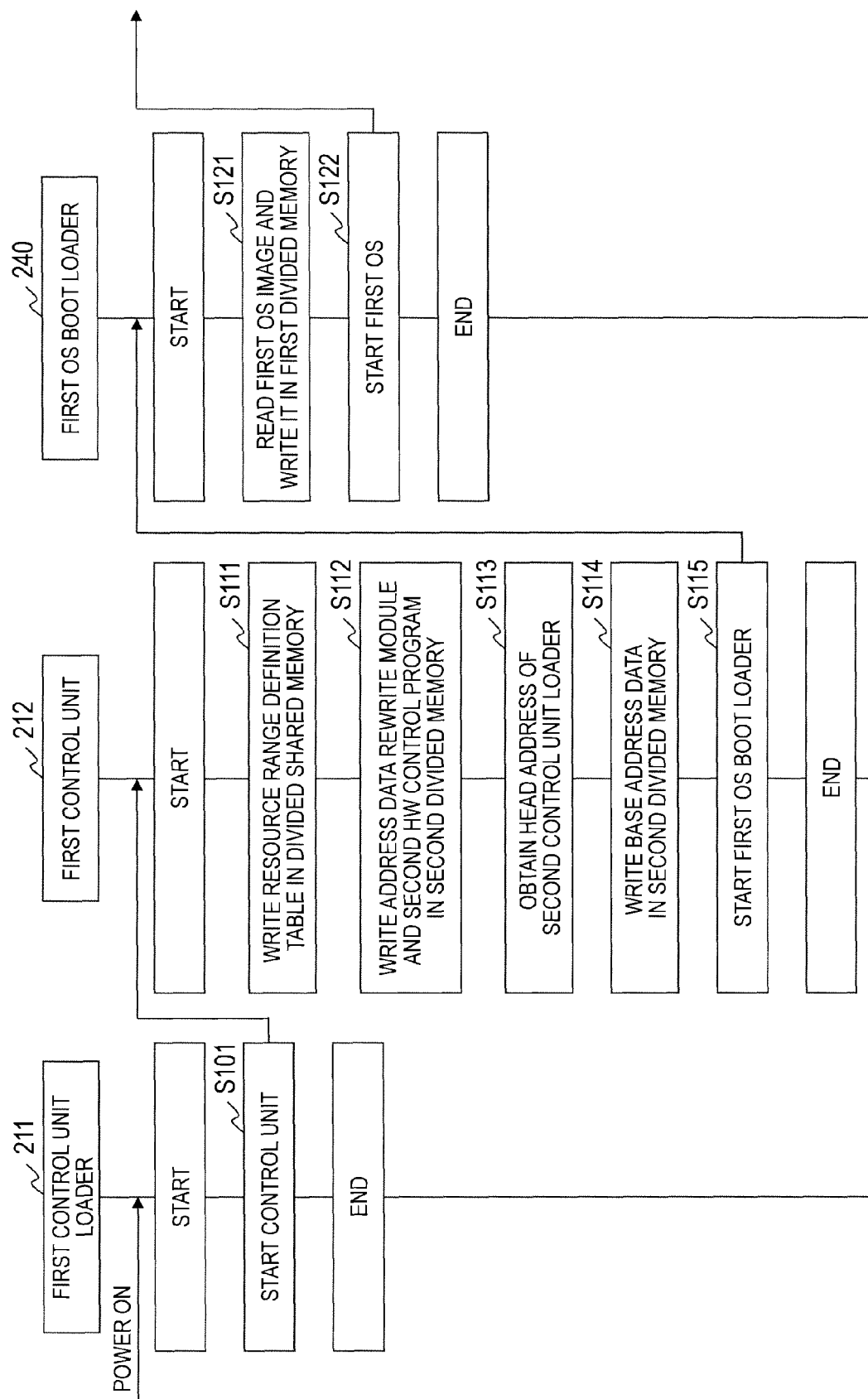
FIG. 7A, FIG. 7B, FIG. 7C and FIG. 7D are sequence diagrams explaining start processing of the computer system according to the first embodiment of the present invention.
Figure 7B:
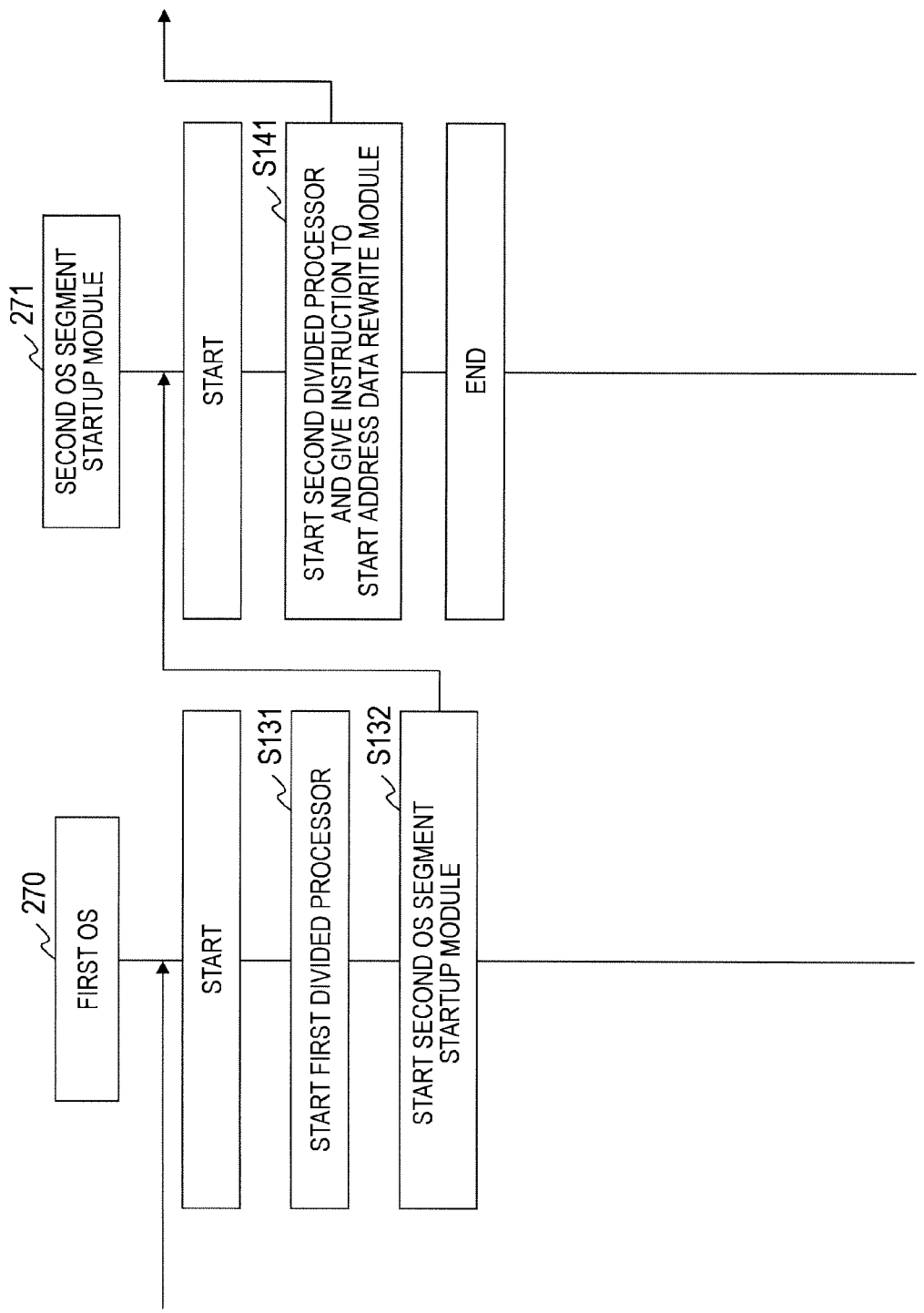
Figure 7C:
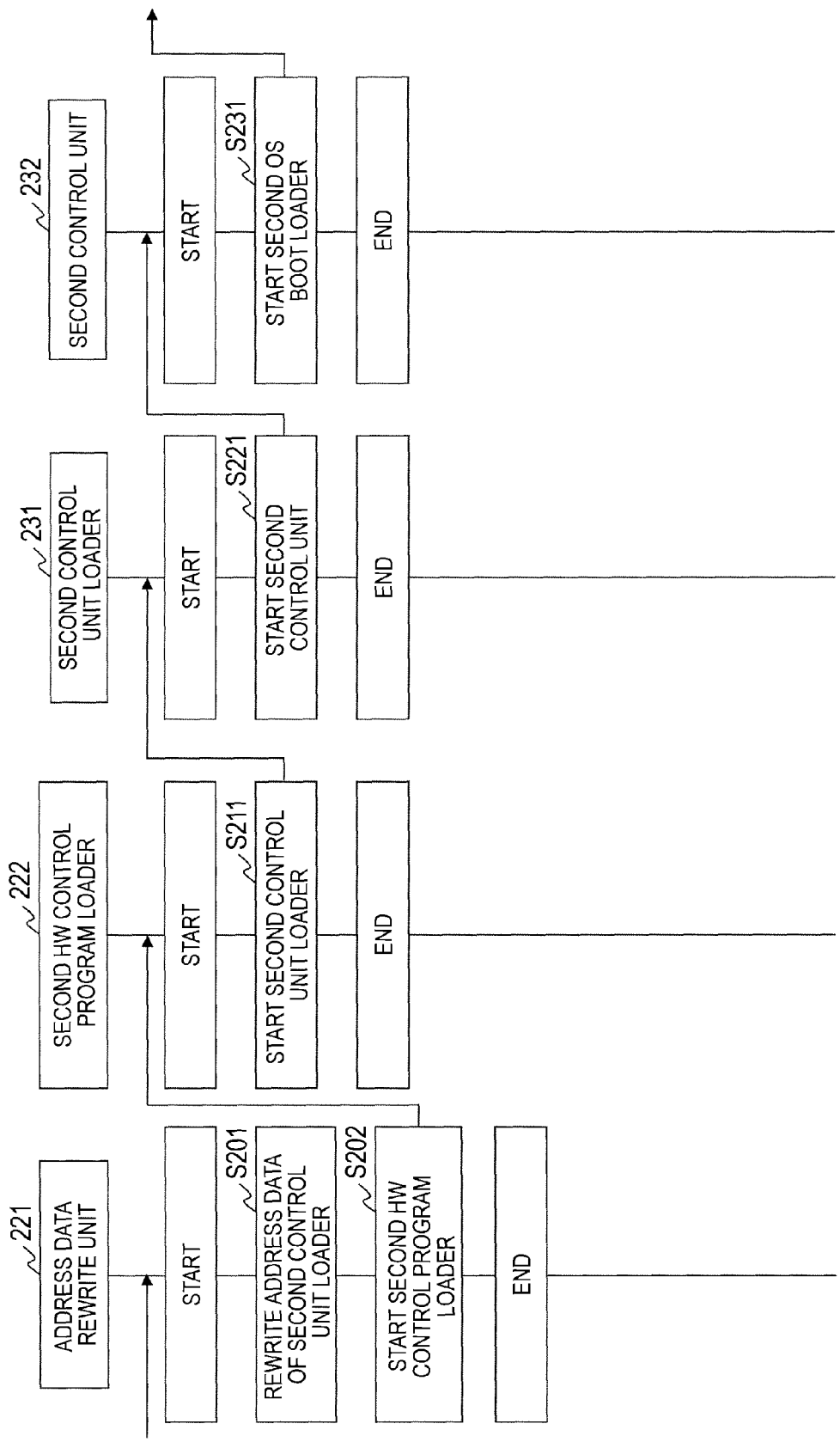
Figure 7D:
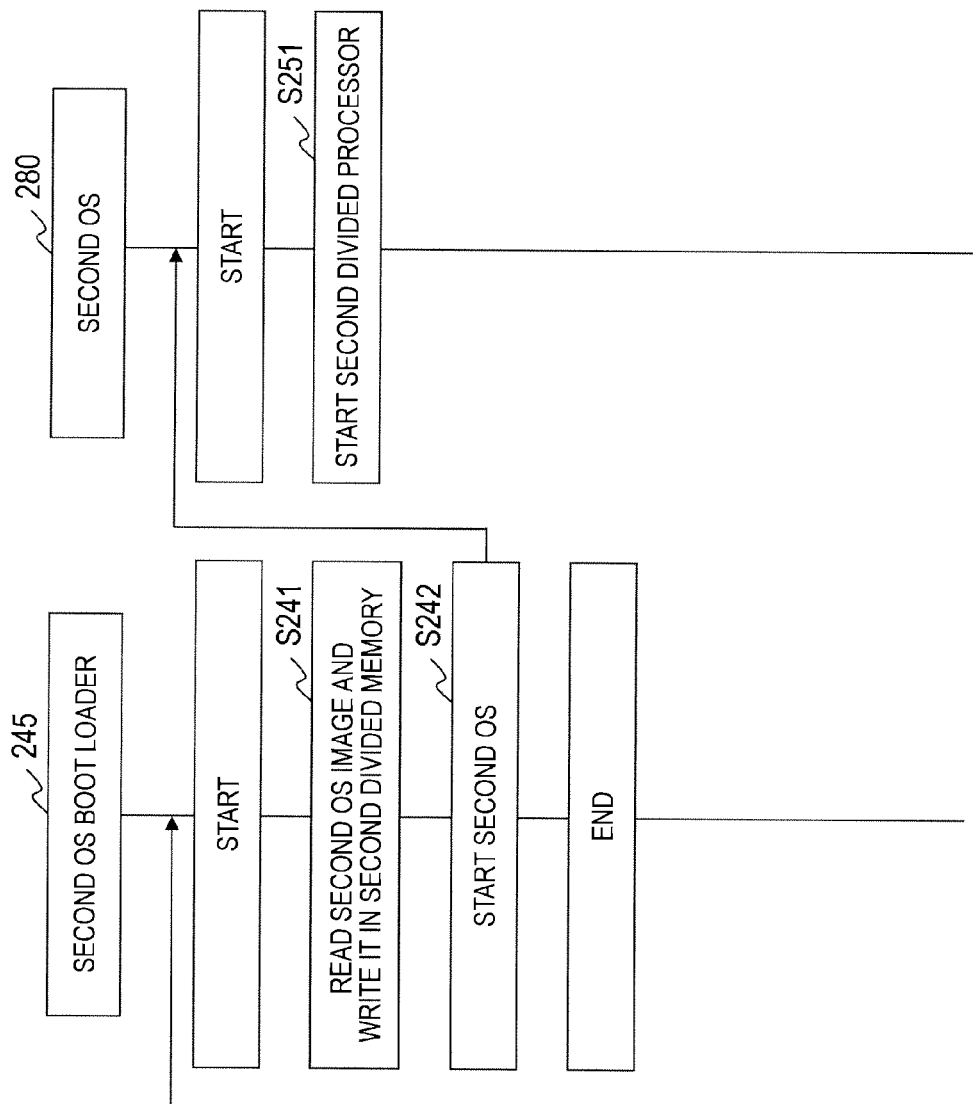

FIG. 6 is an explanatory view illustrating an example of the rewritten address information 233 according to the first embodiment of the present invention.

The rewritten address information 233 stores an offset from the head address of the storage area in which the second control unit loader 231 is stored.

FIG. 7A, FIG. 7B, FIG. 7C and FIG. 7D are sequence diagrams explaining the start processing of the computer system according to the first embodiment of the present invention.

In a case where the physical computer 10 is powered on, the first control unit loader 211 of the first HW control program 210 stored in the ROM 108 is started first. The first control unit loader 211 writes the first HW control program 210 in the memory, and starts the first control unit 212 (step S101). Thereafter, the first control unit loader 211 finishes the processing (step S102).

According to this embodiment, one processor included in the first divided processors 101 executes the first control unit loader 211, and executes the first control unit 212 started by the first control unit loader 211. Further, the first control unit 212 is written in the storage area of the first divided memory 102.

Incidentally, the processor for executing the first control unit loader 211 and the first control unit 212, and the storage area in which the first HW control program 210 is written are not limited to those described above, and can be changed as appropriate according to the system configuration.

In the following explanation, one of the first divided processors 101 that executes the second control unit loader 231 is also referred to as a first processor for starting.

The first control unit 212, after being started, reads the resource range definition information 260 from the first external storage device 20, and writes the read resource range definition information 260 in the divided shared memory 107 (step S111).

The first control unit 212 reads the address data rewrite module 220 and the second HW control program 230 from the first external storage device 20 and, writes the read address data rewrite module 220 and the second HW control program 230 in the second divided memory 105 based on the resource range definition information 260 (step S112).

The first control unit 212 obtains the head address of the storage area in which the second control unit loader 231 included in the second HW control program 230 written in the second divided memory 105 is stored (step S113). The first control unit 212 holds the obtained head address as the base address data 213.

The first control unit 212 writes the base address data 213 in the second divided memory 105 based on the resource range definition information 260 (step S114). According to this embodiment, the first control unit 212 writes the base address data 213 in the storage area that is defined in advance, out of the storage areas of the second divided memory 105.

The first control unit 212 reads the first OS boot loader 240 from the first external storage device 20, writes the read first OS boot loader 240 in the first divided memory 102, and starts the first OS boot loader 240 (step S115). Thereafter, the first control unit 212 finishes its processing. The first OS boot loader 240 is executed by the first processor for starting.

Although the first control unit 212 accesses to the second divided memory 105, it is before the first OS 270 is started and the data of the second OS 280 is not directly dealt with by the first OS 270. Thus, the security problems are not caused.

The first OS boot loader 240, after being started, reads the first OS image 250 from the first external storage device 20 and writes the read first OS image 250 in the first divided memory 102 based on the resource range definition information 260 (step S121).

The first OS boot loader 240 starts the first OS 270 by using the first OS image 250 (step S122). Thereafter, the first OS boot loader 240 finishes its processing. The first processor for starting starts the first OS 270 by using the first OS image 250.

The first OS 270, after being started, starts the first divided processor 101 to be used by the first OS 270, based on the resource range definition information 260 (step S131). After this processing, the first OS 270 runs by using the first divided processor 101.

The first OS 270 starts the second OS segment startup module 271 (step S132). Thereafter, the first OS 270 executes regular processing. Incidentally, the type of the processing executed by the first OS 270 does not limit the present invention.

The second OS segment startup module 271, after being started, starts the second divided processor 104, and instructs for starting the address data rewrite module 220 (step S141). Thereafter, the second OS segment startup module 271 finishes its processing.

Specifically, the second OS segment startup module 271 issues the instruction to start at least one processor out of the second divided processors 104. Hereinafter, the second divided processor 104 that is started by the second OS segment startup module 271 is also referred to as a second processor for starting.

Incidentally, the processing of the step S141 is permitted, only in a case where the second OS segment 302 is started for the first time. Further, this processing is for simply starting the divided processor, which does not mean that the first OS segment 301 uses the divided processor exclusively. Therefore, the problems in security, the allocation policy of the hardware resources and the like are not caused.

The second processor for starting which is started by the second OS segment startup module 271 executes the address data rewrite module 220 written in the second divided memory 105, based on the resource range definition information 260. Thereby, the address data rewrite unit 221 is started first.

The address data rewrite unit 221, after being started, rewrites the address data that is set for the second control unit loader 231 (step S201). Specifically, the following processing is executed.

First, the address data rewrite unit 221 obtains the rewritten address information 233 from the second HW control program 230 written in the second divided memory 105. Thus, the address data to be rewritten is identified.

The address data rewrite unit 221 obtains the base address data 213 written in the second divided memory 105.

The address data rewrite unit 221 adds the value of the base address data 213 to the address data of the storage area in which the address data to be rewritten is stored, based on the rewritten address information 233 to rewrite the address data. For example, a binary code of the second control unit loader 231 is rewritten.

The processing of the step S201 has been explained thus far.

Next, the address data rewrite unit 221 starts the second HW control program loader 222 (step S202). Thereafter, the address data rewrite unit 221 finishes its processing. The second HW control program loader 222 is executed by the second processor for starting.

The second HW control program loader 222, after being started, starts the second control unit loader 231 (step S211). Thereafter, the second HW control program loader 222 finishes its processing. The second control unit loader 231 is executed by the second processor for starting.

The second control unit loader 231, after being started, starts the second control unit 232 (step S221). Thereafter, the second control unit loader 231 finishes its processing. The second control unit 232 is executed by the second processor for starting.

As the second control unit loader 231 executes the processing by using the rewritten address data, according to this embodiment, errors due to invalid addresses are not caused. Incidentally, the processing executed by the second control unit loader 231 is the known processing and detailed explanations thereof are omitted.

The second control unit 232 reads out the second OS boot loader 245 from the second external storage device 30, writes the read-out second OS boot loader 245 in the second divided memory 105, and starts the second OS boot loader 245 (step S231). Thereafter, the second control unit 232 finishes its processing. The second OS boot loader 245 is executed by the second processor for starting.

The second OS boot loader 245, after being started, reads the second OS image 255 from the second external storage device 30 and writes the read second OS image 255 in the second divided memory 105 based on the resource range definition information 260 (step S241).

The second OS boot loader 245 starts the second OS 280 by using the second OS image 255 (step S242). Thereafter, the second OS boot loader 245 finishes its processing. The second processor starts the second OS 280 by using the second OS image 255. The second OS 280 is executed by the second processor for starting.

The second OS 280, after being started, starts the second divided processor 104 used by the second OS 280, based on the resource range definition information 260 (step S251). After this processing, the second OS 280 runs by using the second divided processor 104.

Figure 8:
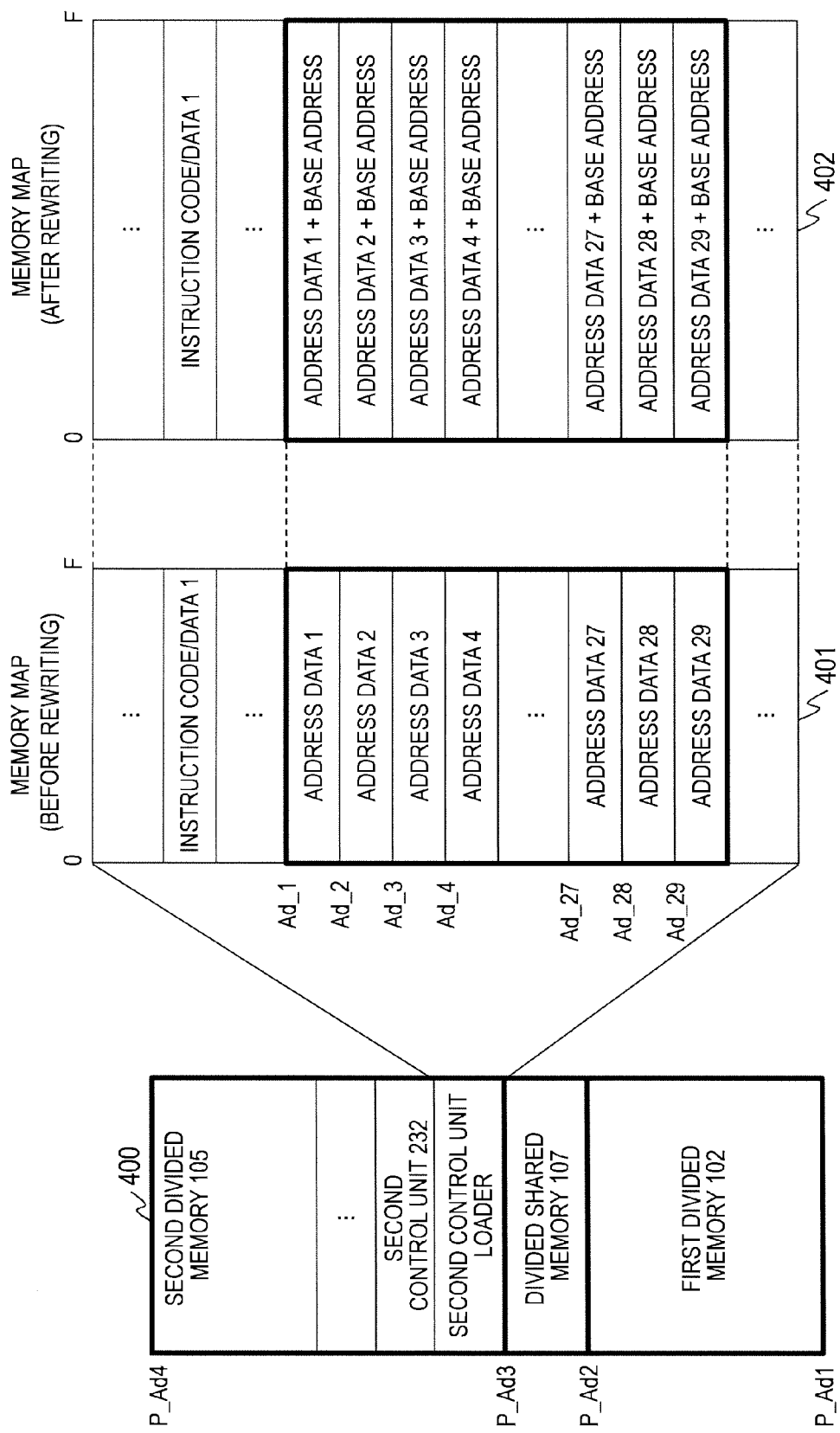
FIG. 8 is an explanatory view illustrating a state of change of an address data of a second control unit loader according to the first embodiment of the present invention.

FIG. 8 is an explanatory view illustrating the state of change of the address data of the second control unit loader 231 according to the first embodiment of the present invention.

Storage areas 400 illustrate the storage areas in the memories included in the physical computer 10. According to this embodiment, the storage area from P_Ad1 (physical address 1) to P_Ad2 (physical address 2) corresponds to the first divided memory 102, the storage area from P_Ad2 (physical address 2) to P_Ad3 (physical address 3) corresponds to the divided shared memory 107, and the storage area from P_Ad3 (physical address 3) to P_Ad4 (physical address 4) corresponds to the second divided memory 105.

Further, a memory map 401 illustrates the memory map of the second control unit loader 231 before the address data is rewritten, and a memory map 402 illustrates the memory map of the second control unit loader 231 after the address data is rewritten.

According to the example illustrated in FIG. 8, the storage areas included in the areas in the thick line frames in the memory maps 401 and 402, that is, the areas from Ad_1 to Ad_29 are the storage areas in which the address data to be rewritten are stored.

As illustrated in FIG. 8, the address data to be stored in each of the storage areas is rewritten by the address data rewrite unit 221 to the value which is obtained by adding the value of the base address data 213 to the original address data.

Thus, it is possible for the second control unit loader 231 to operate normally by referring to the predetermined address in the second divided memory 105. Namely, the normal operation of the second HW control program 230 is made possible no matter which storage area the second HW control program 230 is written in.

As described thus far, according to the present invention, the second HW control program 230 executes the start processing of the second OS 280 and therefore, the second OS 280 can be started without the direct involvement of the first OS 270.

Further, as the address data of the second control unit loader 231 included in the second HW control program 230 is rewritten in advance, it is possible to start the second HW control program 230 no matter which storage area the second HW control program 230 is written in.

Therefore, in a case where the system is configured in such a manner that the first OS 270 cannot deal with the data of the second OS 280, and in a case where the device driver of the first HW control program 210 does not support the second external storage device 30, it is possible to start the second OS 280.

Modification Example 1

According to the first embodiment, the second HW control program 230 holds the rewritten address information 233, but the present invention is not limited to the above. In such a case, the processing of the step S201 is as follows.

The address data rewrite unit 221 refers to an execution form file of the second control unit loader 231 and, identifies the storage area in which the address data to be rewritten is included based on a relocation section (relocation information) included in the execution form file.

With regard to the execution form file of the second control unit loader 231, such a method may be employed that the file is stored in advance in the first external storage device 20 or the like, and is written in the second divided memory 105 by the first control unit 212.

The other processing is the same as that of the first embodiment, and hence a description thereof is omitted.

Modification Example 2

According to the first embodiment, the first control unit 212 writes the address data rewrite module 220 and the second HW control program 230 in the second divided memory 105, but the present invention is not limited to the above.

As another method, an arbitrary program that runs on the first OS segment 301 writes the address data rewrite module 220 and the second HW control program 230 in the second divided memory 105. In this case, the following processing is required for enabling temporary access to the second divided memory 105.

The arbitrary program generates a writable page table in a part of the storage area of the second divided memory 105 and, maps the part of the storage area of the second divided memory 105 into virtual memory space for the first OS 270 by referring to the page table.

After the address data rewrite module 220 and the second HW control program 230 are written in the second divided memory 105, the arbitrary program releases the mapping of the part of the storage area of the second divided memory 105 that is mapped into the virtual memory space for the first OS 270. Thus, the access to the second divided memory 105 is prohibited.

As another method, the first control unit 212 writes the address data rewrite module 220 and the second HW control program 230 in the divided shared memory 107, instead of the second divided memory 105. In this case, it is preferable that the second divided processor 104 is configured to access to the divided shared memory 107.

In the embodiments, the example of using the control in a software manner is described, but it is also possible to realize a part thereof in a hardware manner.

The embodiments have been described above in detail with reference to the accompanying drawings, but the embodiments are not limited to the above-mentioned specific configurations, and include various changes and similar configurations that fall within the scope of the attached claims.

What is claimed is:

1. A computer system comprising a plurality of computers on which a plurality of operating systems run, wherein each of the plurality of computers includes a processor, a first memory coupled to the processor, a second memory coupled to the processor, an I/O device coupled to the processor, and a storage device coupled to the processor, wherein the plurality of operating systems include a first operating system and a second operating system, wherein the second memory stores a first hardware control unit for controlling hardware included in the computer and executing start processing of the first operating system, in a case where the first operating system is started, wherein the storage device stores a first operating system image as an execution image of the first operating system, a first operating system boot loader for starting the first operating system, a second operating system image as an execution image of the second operating system, a second operating system boot loader for starting the second operating system, a second hardware control unit for controlling the hardware included in the computer and executing start processing of the second operating system, in a case where the second operating system is started, and an address rewrite unit for rewriting address data which is an absolute address of a storage area in the first memory, the storage area stores information to be referred to by the second hardware control unit, wherein the second hardware control unit includes a start unit for starting the second hardware control unit, wherein the processor is configured to write in the first memory the first hardware control unit stored in the second memory, and execute the first hardware control unit, in a case of being powered on, wherein the first hardware control unit is configured to:

read the second hardware control unit and the address rewrite unit from the storage device to write in a predetermined storage area of the first memory;

obtain a head address of a storage area in which the start unit included in the second hardware control unit is stored, and write the head address in the first memory as base address data;

read the first operating system boot loader from the storage device to write in the first memory; and start the first operating system boot loader written in the first memory, wherein the first operating system boot loader is configured to:

read the first operating system image from the storage device to write in the first memory; and start the first operating system by executing the first operating system image written in the first memory, wherein the first operating system is configured to start the address rewrite unit, wherein the address rewrite unit is configured to:

obtain the base address data written in the first memory, obtain an address of a storage area, in which address data to be rewritten is stored, as a target address, rewrite the address data stored in the storage area corresponding to the obtained target address, based on the obtained base address data, and start the start unit, wherein the start unit is configured to start the second hardware control unit by using the rewritten address data, wherein the second hardware control unit is configured to:

read the second operating system boot loader from the storage device to write in the first memory; and start the second operating system boot loader written in the first memory, and wherein the second operating system boot loader is configured to:

read the second operating system image from the storage device to write in the first memory; and start the second operating system by executing the second operating system image written in the first memory.

2. The computer system according to claim 1, wherein the address rewrite unit is configured to:

obtain information on the target address from the second hardware control unit, and rewrite the address data by adding the base address data to the address data which is stored in the storage area corresponding to the obtained target address.

3. The computer system according to claim 2, wherein the address rewrite unit is configured to obtain the information on the target address by referring to an execution form file of the second hardware control unit.

4. The computer system according to claim 3, wherein the storage device includes a first storage device and a second storage device, wherein the first storage device stores the first operating system image, the first operating system boot loader, the second hardware control unit, and the address rewrite unit, and wherein the second storage device stores the second operating system image, and the second operating system boot loader.

5. A startup method of a computer on which a plurality of operating systems run, wherein the computer includes a processor, a first memory coupled to the processor, a second memory coupled to the processor, an I/O device coupled to the processor, and a storage device coupled to the processor, wherein the plurality of operating systems include a first operating system and a second operating system, wherein the second memory stores a first hardware control unit for controlling hardware included in the computer, and executing start processing of the first operating system, in a case where the first operating system is started, wherein the storage device stores a first operating system image as an execution image of the first operating system, a first operating system boot loader for starting the first operating system, a second operating system image as an execution image of the second operating system, a second operating system boot loader for starting the second operating system, a second hardware control unit for controlling the hardware included in the computer and executing start processing of the second operating system, in a case where the second operating system is started, and an address rewrite unit for rewriting address data which is an absolute address of a storage area in the first memory, the storage area stores information to be referred to by the second hardware control unit, and wherein the second hardware control unit includes a start unit for starting the second hardware control unit, the startup method including:

a first step of writing, by the processor, in the first memory the first hardware control unit stored in the second memory, and executing the first hardware control unit, in a case of being powered on;

a second step of reading, by the first hardware control unit executed by the processor, the second hardware control unit and the address rewrite unit from the storage device to write in a predetermined storage area of the first memory;

a third step of obtaining, by the first hardware control unit executed by the processor, a head address of a storage area in which the start unit included in the second hardware control unit is stored, and writing the head address in the first memory as base address data;

a fourth step of reading, by the first hardware control unit executed by the processor, the first operating system boot loader from the storage device to write in the first memory;

a fifth step of starting, by the first hardware control unit executed by the processor, the first operating system boot loader written in the first memory;

a sixth step of reading, by the first operating system boot loader executed by the processor, the first operating system image from the storage device to write in the first memory;

a seventh step of starting, by the first operating system boot loader executed by the processor, the first operating system by executing the first operating system image written in the first memory;

an eighth step of starting, by the first operating system executed by the processor, the address rewrite unit;

a ninth step of obtaining, by the address rewrite unit executed by the processor, the base address data written in the first memory;

a tenth step of obtaining, by the address rewrite unit executed by the processor, an address of a storage area, in which address data to be rewritten is stored, as a target address;

an eleventh step of rewriting, by the address rewrite unit executed by the processor, the address data stored in the storage area corresponding to the obtained target address, based on the obtained base address data;

a twelfth step of starting, by the address rewrite unit executed by the processor, the start unit;

a thirteenth step of starting, by the start unit executed by the processor, the second hardware control unit by using rewritten address data;

a fourteenth step of reading, by the second hardware control unit executed by the processor, the second operating system boot loader from the storage device to write in the first memory;

a fifteenth step of starting, by the second hardware control unit executed by the processor, the second operating system boot loader written in the first memory;

a sixteenth step of reading, by the second operating system boot loader executed by the processor, the second operating system image from the storage device to write in the first memory; and a seventeenth step of starting, by the second operating system boot loader executed by the processor, the second operating system by executing the second operating system image written in the first memory.

6. The startup method according to claim 5,
wherein, in the tenth step, information on the target address is obtained from the second hardware control unit, and
wherein, in the eleventh step, the address data is rewritten by adding the base address data to the address data which is stored in the storage area corresponding to the obtained target address.

7. The startup method according to claim 6,
wherein, in the tenth step, the information on the target address is obtained by referring to an execution form file of the second hardware control unit.

8. The startup method according to claim 7,
wherein the storage device includes a first storage device and a second storage device,
wherein the first storage device stores the first operating system image, the first operating system boot loader, the second hardware control unit, and the address rewrite unit, and
wherein the second storage device stores the second operating system image, and the second operating system boot loader.

* * * * *